Nov. 9, 1926.  1,606,556
B. H. ZIEHLER
AUTOMATIC RELIEF VALVE
Filed Oct. 26, 1920   2 Sheets-Sheet 1
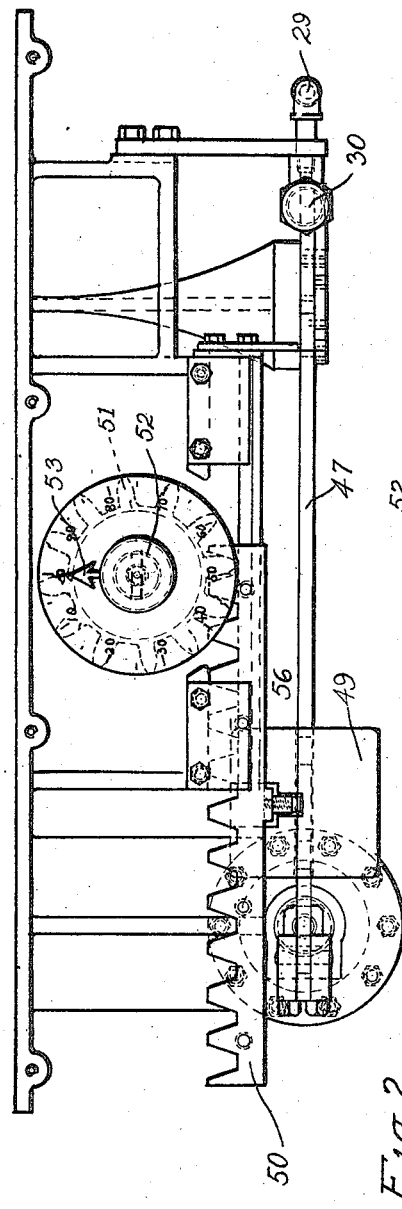
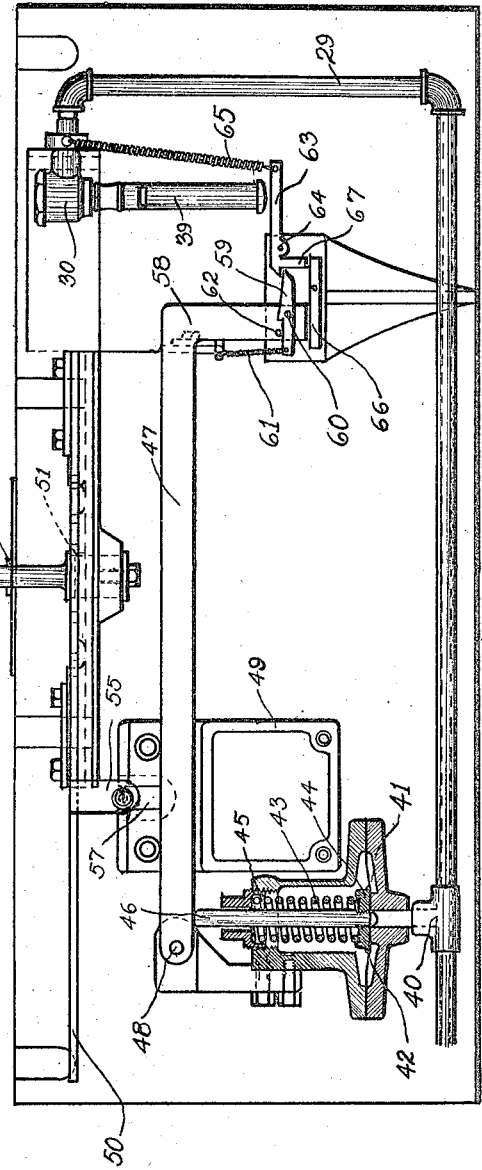
INVENTOR
Bernard H Ziehler
BY
H. L. Walker
ATTORNEY.

Nov. 9, 1926.
B. H. ZIEHLER
1,606,556
AUTOMATIC RELIEF VALVE
Filed Oct. 26, 1920   2 Sheets-Sheet 2
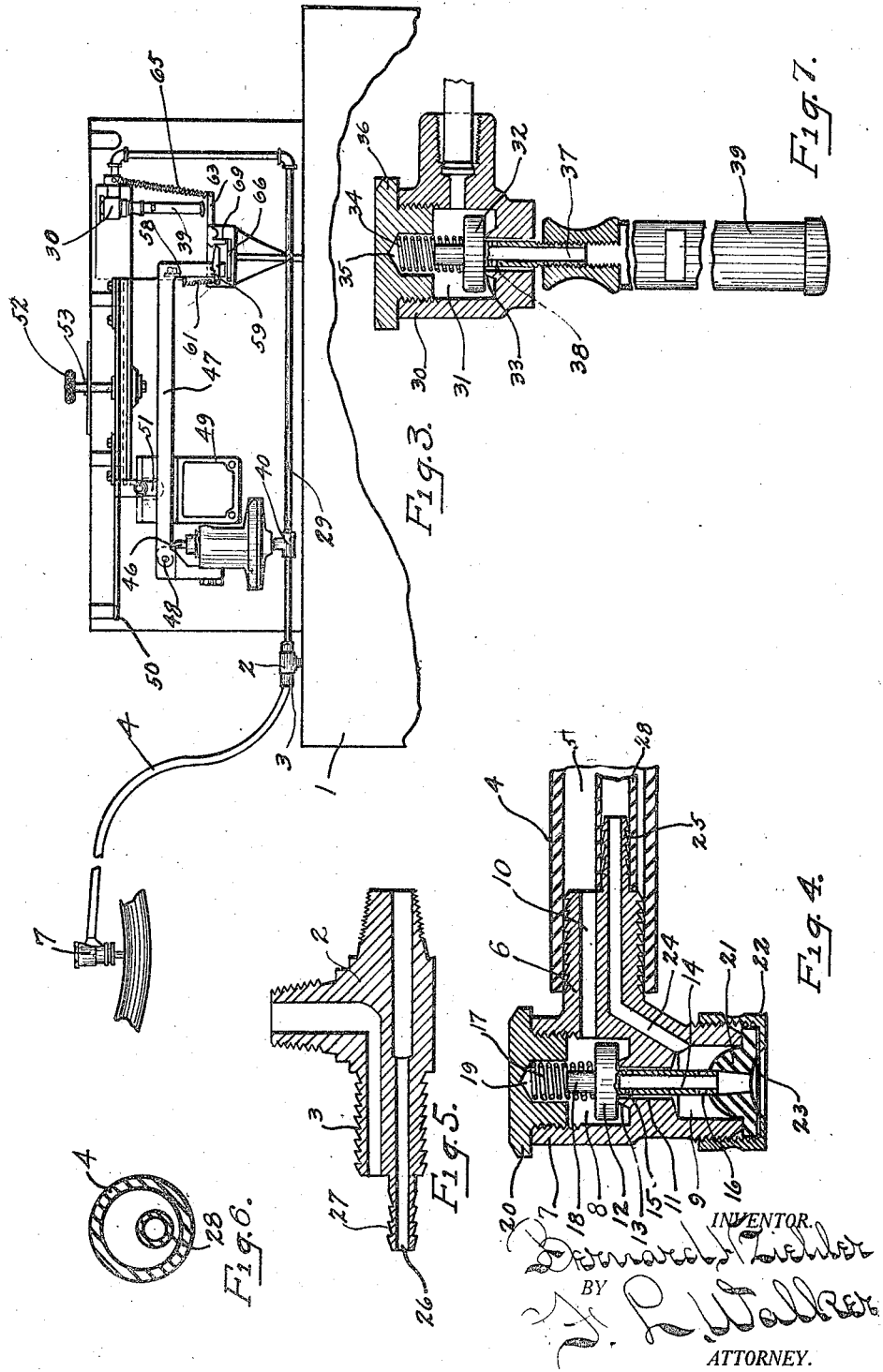

Patented Nov. 9, 1926.

1,606,556

UNITED STATES PATENT OFFICE.

BERNARD H. ZIEHLER, OF DAYTON, OHIO.

AUTOMATIC RELIEF VALVE.

Application filed October 26, 1920. Serial No. 419,616.

My invention relates to automatic pressure regulating devices, and more particularly to a control mechanism for compressed air supply stations to prevent the overinflation of pneumatic tires.

The object of the invention is to simplify the structure as well as the means and mode of operation of such devices whereby they will not only be cheapened in construction, but will be more efficient in use, positive in operation, automatic in action, easily and quickly adjusted and unlikely to get out of repair.

A further object of the invention is to provide adjustable regulating means whereby the control apparatus may be set to insure any predetermined pressure within the range of the apparatus, or the capacity of the supply station, and means for automatically relieving any excess pressure when such predetermined degree of pressure has been attained.

A further object of the invention is to provide a quick acting tripping mechanism for the relief valve, which will be automatically operated by the back pressure, and to further provide in connection therewith an automatic alarm signal.

A further object of the invention is to provide an improved form of hose connection or nozzle by which the fluid under pressure may not only be discharged into a tire or other receiver, but the back pressure therefrom transmitted thru such nozzle to the automatic relief valve and tripping mechanism therefor.

With the above primary and other incidental objects in view as will more fully appear in the specification the invention consists of the features of construction, the parts and combinations thereof and the mode of operation, or their equivalents as hereinafter described and set forth in the claims.

Referring to the drawings, Fig. 1 is a side elevation of the assembled apparatus forming the subject matter hereof. Fig. 2 is a top plan view and Fig. 3 is a side elevation of the pressure adjusting and back pressure operated control means for the relief valve. Fig. 4 is a detail sectional view of the connector or nozzle. Fig. 5 is a detail sectional view of the duplex coupling one passage of which is to the high pressure or supply line and leads to the fluid pressure reservoir, while the other passage pertains to the back pressure and communicates with the automatic release valve control mechanism. Fig. 6 is a cross sectional view of the flexible hose leading from the duplex coupling to the nozzle, showing the back pressure conduit therein. Fig. 7 is a detail view of the relief valve.

Like parts are indicated by similar characters of reference throughout the several views.

The device forming the subject matter hereof is primarily designed for use in connection with compressed air supply stations, for the inflation of pneumatic vehicle tires. The device embodies means by which the driver desiring to inflate his vehicle tires may set the mechanism to any predetermined pressure in accordance with the size and capacity of the tires and his personal wishes. When this predetermined capacity has been attained within the tire being charged, the back pressure therefrom will automatically actuate a relief valve to divert any excess pressure and prevent overinflation. The relief valve is controlled by a quick acting tripping mechanism under the direct control of such back pressure actuated means, whereby the pressure is immediately and quickly relieved when the predetermined degree of pressure has been attained. Not only does the apparatus relieve the excess pressure, but it automatically sounds an alarm signal by the fluid under pressure, to call attention to the fact that the tire is fully inflated.

In the preferred form of the apparatus as illustrated in the drawing, 1 is the supply reservoir for the fluid or air under pressure. The fluid under pressure is discharged from the reservoir 1 thru one passage of a duplex T coupling 2, connected to said reservoir, one branch of which forms a spud 3, for the connection of a flexible conduit 4 for the fluid under pressure. This conduit 4 communicates thru the passage 5, with the supply reservoir 1 at one end and at its opposite end is connected to the spud 6 of the nozzle or connector 7. The nozzle 7 is divided medially into a high pressure chamber 8 and a low pressure chamber 9. The conduit 4 communicates with the high pressure chamber 8, thru a passageway 10 in the spud 6. The high and low pressure chambers 8 and 9 are provided with an intercommunicating passage 11, controlled by a reciprocatory puppet valve 12 which engages a suitable valve seat 13. The stem of the valve 12 is preferably though not necessarily of tubular form as at 14 and provided with laterally disposed ports or vents 15 and 16 the former communicating with the high pressure chamber 8 when the valve is elevated, and the latter at all times communicating with the low pressure chamber 9. In lieu of this construction the valve stem may be of the ordinary longitudinally grooved or winged type, which will permit the unrestricted passage of the fluid under pressure from the high pressure chamber 8 thru the intercommunicating passage 11, when the valve is elevated. The valve 12 is normally held upon its seat 13 by a tensioned spring 17, engaged about a stud 18 projecting from the top of the valve and seated within a socket or recess 19, within a cap or plug 20 screw threaded in the top of the nozzle 7. At its lower end the nozzle 7 carries a resilient or yielding collar or bushing 21, secured in position by the adjustable cap 22, screw threaded upon the exterior of the nozzle. To enable the easy adjustment of the cap 22 without distorting the resilient collar or bushing 21, there is preferably interposed between the exterior of the resilient collar 21 and the cap, a paper gasket or washer 23, of other suitable material, preferably, though not necessarily possessing anti-friction characteristics.

The stem 14 of the valve projects into proximity to or preferably within the yielding collar or bushing 21, and is directly engaged by the valve stem of the tire when the nozzle or connector is pressed thereon to elevate the valve 12 off of its seat 13. It will be understood that when operatively connected the tire stem projects thru the opening in the cap 22 and yielding resilient bushing or collar 21, which by its contraction thereon affords a compression tight joint.

If uncontrolled the fluid under pressure will continue to flow thru the conduit 4 and nozzle 7 into the tire or other receiver being inflated, until the pressure therein equalizes with that within the supply reservoir 1, which in most instances, would result in overinflation and the bursting of the tire. In the present instance the back pressure from the tire is utilized to arrest the further inflation at any predetermined degree of pressure. To this end a low presure chamber 9 of the nozzle which at all times is in direct communication with the tire, thru the vent port 16, communicates with a back pressure passage 24, extending thru the spud connection 6 of the nozzle and therebeyond thru an auxiliary spud 25 of smaller diameter, formed integral with and projecting beyond the main spud 6. The low pressure passage 26 of the duplex T coupling 2 is provided with a light auxiliary spud 27, which is connected with the auxiliary spud 25 of the nozzle by a back pressure conduit 28, of smaller diameter than the fluid pressure supply conduit 4, and carried therein as indicated in the transverse detail sectional view of the conduit in Fig. 6.

Extending beyond the duplex T connection 2 and communicating with the back pressure passage 26 thereof, is a back pressure conduit 29 leading to a relief valve 30. The relief valve 30 is somewhat of the same type as the nozzle 7, except that it is not provided with the low pressure chamber and back pressure passage corresponding to the passage 24 and chamber 9. In the construction shown the relief valve 30 comprises a main housing having therein a chamber 31, with which the conduit 29 communicates. Located in this chamber 31 is a reciprocatory puppet valve 32 engaging a valve seat 33, upon which it is pressed by a tensioned spring 34 seated in a suitable socket or recess 35 in a top cap or plug 36. The puppet valve is provided with a hollow or tubular stem 37, having lateral vents or ports 38 communicating with the chamber 31, when the valve is unseated. Attached to the pendant tubular stem 37 is an alarm whistle 39, operated by the fluid under pressure discharged thru the tubular valve stem 37 when the valve is elevated. It will be noted that the pressure upon the valve does not in any way tend to unseat the valve as in the ordinary relief or pop-off valve, but that the relief valve as thus described is wholly dependent upon means for its operation.

To effect the tripping of this valve, and to regulate the priming thereof, in accordance with the degree of back pressure, from the tire being inflated, the conduit 29 at an intermediate point 40, communicates with a diaphragm chamber 41, having therein the flexible diaphragm 42. The diaphragm 42 is actuated by the fluid under pressure against the tension of a helical spring 43. This spring 43 bears at one end upon a head 44 carried by the diaphragm 42, and at its opposite end upon an adjustable abutment 45, by which the tension of the spring may be regulated. The head 44 carries a vertically projecting stem or rod 46, which reciprocates with the fluctuations of the diaphragm 42. Resting upon the upper end of the standard or rod 46 is an oscillatory lever or beam 47, pivoted at 48. This lever or beam 47 is in effect a scale beam, and carries thereon a longitudinally adjustable counterbalance or weight 49. It will be obvious that by adjusting the counterbalance or weight 49 to various positions upon the lever or beam 47, the resistance of the diaphragm to the back pressure of the fluid may be varied. To adjust this weight longitudinally upon the beam, there is provided upon the main frame or housing of the apparatus a reciprocatory rack bar 50, slidingly mounted for to and fro movement under the influence and control of a revoluble pinion wheel 51. The pinion wheel is rotated by a suitable hand wheel or handle 52, which also actuates an indicator or pointer hand 53 co-operating with a suitable dial or series of graduations to indicate the degrees of pressure resisted by the apparatus when the counterpoise or weight is in its different positions of adjustment. The reciprocatory rack 50 is provided with a dependent finger 55 and anti-friction-roller 56, projecting within a bifurcation or slot 57, in the counterpoise or weight. By this means, as the rack is reciprocated by the revoluble adjustment of the handle to bring the indicator to the desired pressure indication, the counterpoise will be slidingly adjusted upon the lever or beam 47 to afford the necessary resistance to the fluctuation of the diaphragm. Thus the apparatus is adjusted to resist any degree of back pressure, and a degree of resistance is indicated in units of pressure by the adjustable indicator, which is set manually by the operator to the inflation pressure desired. At its free end the lever or beam 47 has been shown down-turned as at 58, carrying a spring actuated pawl 59. This pawl 59 is pivoted at 60 and its rear end is drawn upward by a retracting spring 61 against a stop pin 62. The structure is such that the pawl will yield upwardly but will resist any pressure in the opposite direction. This detent pawl 59 projects into the path of travel of one end of a pivoted trip lever 63, pivoted at 64, the opposite end of which is connected to a retracting spring 65. The construction is such that upon the upward movement of the free end of the beam or lever 47, under the influence of pressure upon the diaphragm 42, the detent pawl 59 engages beneath the overhanging end of the trip lever 63, and oscillates the trip lever against the tension of its retracting spring 65. As the lever 47 continues to move upwardly, the detent pawl 59 passes beyond the end of the trip lever 63, releasing said lever, which is thereupon forcibly retracted by its spring 65 impinging upon the lower end of the dependent whistle 39. The impact of the trip lever 63 upon the alarm whistle 39 elevates the whistle and with it the relief valve 31 to which it is attached thereby permitting the escape of excess fluid under pressure, which not only by-passes the fluid pressure supply, away from the tire being inflated, but also sounds the alarm whistle 39. Upon the return movement of the lever or beam 47, the yielding detent pawl 59 will readily pass the extremity of the trip lever 63 to a position therebelow as shown in the drawings, preparatory to the next operation. Beneath the lever 47 and trip lever 63 is a pivoted equalizer 66, engaged at one end by the downturn extremity 58 of the beam or lever 47, and at its opposite end by a downwardly projecting finger or extension 67, carried by the trip lever 63. This equalizer is pivoted at an intermediate point and serves merely as a stop for the levers 47 and 63, when in their lowered or normal position. This equalizing stop may be dispensed with without destroying the function of the tripping mechanism. It will be understood that the mechanism thus described effects the sudden or instantaneous opening of the relief valve to its full extent whereas the ordinary pop-off or relief valve as ordinarily used opens gradually.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific detail shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In an automatic pressure regulator of the character described, a fluid pressure actuated oscillatory lever, a weight adjustable longitudinally upon said lever to vary the resistance of the lever to movement under the influence of the fluid pressure, means for reciprocating the weight, an indicator movable in unison with the weight for indicating the effective resistance of the weighted arm in various positions of adjustment of the weight, and a signal alarm actuated by the movement of the lever under the influence of the fluid pressure.

2. In an automatic pressure regulator of the character described, a fluid pressure actuated oscillatory lever, a weight adjustable longitudinally upon said lever to vary the resistance of the lever to movement under the influence of the fluid pressure a housing enclosing said lever and adjustable weight, means located exteriorly of the housing for reciprocating the weight, an indicator also located exteriorly of the housing, and movable in unison with the weight, for indicating the effective resistance of the weighted arm in various positions of adjustment of the weight, and a relief valve actuated by the movement of the lever.

3. In an automatic pressure regulator, a pressure actuated lever, an adjustable weight thereon, affording variable resistance to the movement of the lever, a rack and pinion adjustment means for said weight, a revoluble indicator actuated by said rack and pinion adjustment means to indicate the effective resistance of the weighted lever, and means for preventing pressure in excess of that corresponding to the adjusted position of the weight controlled by the movement of the lever.

4. In an automatic pressure regulator, a pressure actuated lever, an adjustable weight carried thereby affording variable resistance to the movement of the lever, revoluble adjusting means for adjusting the weight, indicator means coacting with said revoluble adjusting means to indicate the effective resistance of the weighted lever, and means controlled by the movement of the lever for limiting the effective pressure to the indicated resistance of the weighted lever.

5. In an apparatus of the character described, a relief valve, a spring actuated trip lever for said valve, an oscillatory scale beam, an adjustable counterpoise thereon, and back pressure actuated means for oscillating said scale beam against the resistance of the counterpoise, means normally holding the trip lever inactive but adapted upon oscillation of the scale beam to release the trip lever to actuate the valve.

6. In an apparatus of the character described, a relief valve, a spring actuated impact lever for delivering a blow to said valve to operate same, a movable pressure operated control member, a detent carried thereby engaging said impact lever to oscillate said lever away from the valve against the tension of its retractive spring, said lever being released upon further movement of the pressure operated member to permit its impingement upon the valve to operate the same.

7. In an apparatus of the character described, a relief valve, a spring actuated trip lever therefor, a scale beam, an adjustable counterpoise thereon, pressure operated means for oscillating the scale beam and means controlled thereby for initially tensioning the trip lever and upon further movement releasing the trip lever to effect the operation of the valve.

8. In an apparatus of the character described, a relief valve, means for imparting a blow to said valve to effect its sudden operation, pressure operated tensioning means therefor, said blow imparting means being automatically released upon the movement of the pressure operated tensioning means to a predetermined degree.

9. In an apparatus of the character described, a fluid pressure supply means, a reciprocatory valve controlling the fluid under pressure, a hollow stem for said valve, a fluid pressure operated whistle attached to said valve stem, and fluid pressure operated means for reciprocating the valve stem and whistle at a predetermined pressure to open said valve to actuate the whistle.

10. In an apparatus of the character described, a fluid pressure operated alarm, a valve controlling the alarm, quick acting valve operating means controlling the valve, and pressure operated means for tensioning said valve operating means, said valve operating means being automatically released to effect the opening of the valve and operation of the alarm when a predetermined pressure has been attained.

11. In an apparatus of the character described, a pressure actuated oscillatory lever, an adjustable weight carried thereby to vary the resistance of the arm, a relief valve, a trip lever therefor extending into the path of travel of said pressure operated oscillatory lever and actuated by movement thereof, a retracting spring against the tension of which the trip lever is actuated, said oscillatory lever and trip lever being disengaged subsequent to the tensioning of the retracting spring by the movement of said lever, whereupon the impingement of the trip lever under the influence of the retracting spring will effect the operation of the valve.

12. In an apparatus of the character described, a relief valve, an oscillatory trip arm therefor, an actuating spring for the trip arm, a pressure actuated operator, a detent finger carried thereby engaging the trip arm when said operator is moved in one direction but yieldingly passing said arm when moved in the opposite direction, and adjustable means for varying the resistance of the operator to the fluid pressure whereby said operator may be influenced by different pressures to engage and oscillate the trip arm against the tension of its spring to effect the operation of the valve.

13. In an apparatus of the character described, the combination with a supply conduit for delivery of fluid under pressure, a valve adapted by its operation to check the increase of pressure delivered thru said conduit, a scale beam subjected to the pressure of the fluid being delivered, a counter balance for varying the resistance of the scale beam to such pressure and quick acting trip mechanism controlled by the movement of said scale beam for effecting the sudden operation of such valve when the pressure exceeds a predetermined maximum.

14. In an apparatus of the character described, the combination with a supply conduit for the delivery of fluid under pressure, of a variable pressure regulator including an oscillatory scale beam and a counter balance weight adjustable thereon, adapted by its adjustment to predetermine the maximum pressure of fluid supplied thru said conduit, and a valve adapted to check the further increase of pressure and quick acting trip mechanism for said valve actuated by the movement of the scale beam for effecting sudden operation of the valve when the predetermined maximum pressure has been attained.

15. In an apparatus of the character described, a reservoir for air or the like under pressure, a supply conduit leading therefrom, a discharge nozzle carried by said conduit, a back pressure return conduit from said nozzle, an exhaust valve with which said return conduit communicates, an expansion chamber with which said return conduit also communicates, a weighted beam actuated by the fluctuation of said expansion chamber and means for opening the exhaust valve by the movement of said weighted beam.

16. In an apparatus of the character described, a reservoir for air or the like under pressure, a supply conduit leading therefrom, a discharge nozzle carried by said conduit, a back pressure return conduit from said nozzle, an exhaust valve with which the back pressure conduit communicates and means for varying the resistance to operation of said valve, and snap off mechanism for effecting the sudden operation of said exhaust valve when the back pressure exceeds a predetermined maximum.

In testimony whereof, I have hereunto set my hand this 15 day of October A. D. 1920.

BERNARD H. ZIEHLER.